(12) United States Patent
Licht et al.

(10) Patent No.: US 11,257,004 B2
(45) Date of Patent: Feb. 22, 2022

(54) REINFORCEMENT MACHINE LEARNING FOR ITEM DETECTION

(71) Applicant: NCR Corporation, Atlanta, GA (US)

(72) Inventors: Yehoshua Zvi Licht, Alpharetta, GA (US); Robert David Saker, Sandy Springs, GA (US)

(73) Assignee: NCR Corporation, Atlanta, GA (US)

(*) Notice: Subject to any disclaimer, the term of this patent is extended or adjusted under 35 U.S.C. 154(b) by 804 days.

(21) Appl. No.: 16/050,707

(22) Filed: Jul. 31, 2018

(65) Prior Publication Data

US 2020/0042491 A1 Feb. 6, 2020

(51) Int. Cl.
*G06N 20/00* (2019.01)
*G07G 1/14* (2006.01)
*G07G 1/00* (2006.01)
*G06K 9/00* (2022.01)

(52) U.S. Cl.
CPC ......... *G06N 20/00* (2019.01); *G06K 9/00664* (2013.01); *G07G 1/0045* (2013.01); *G07G 1/14* (2013.01)

(58) Field of Classification Search
CPC .......... G06N 20/00; G06N 3/006; G07G 1/14; G07G 1/0045; G07G 1/0063; G06K 9/00664; G06K 9/627; G06Q 20/208
See application file for complete search history.

(56) References Cited

U.S. PATENT DOCUMENTS

| 10,540,551 B2 * | 1/2020 | Srivastava | G06K 9/00201 |
| 2017/0185985 A1 * | 6/2017 | Harada | G06N 20/00 |
| 2018/0293501 A1 * | 10/2018 | Ambati | G06N 5/02 |
| 2019/0080277 A1 * | 3/2019 | Trivelpiece | G06K 9/00771 |

* cited by examiner

*Primary Examiner* — Seung H Lee
(74) *Attorney, Agent, or Firm* — Schwegman, Lundberg & Woessner (57) ABSTRACT

Images of an unknown item picked from a store are tracked, the unknown item is identified during checkout and associated with a specific item having a specific item description. The images and the specific item description are obtained by a machine-learning item detector and processed during a machine-learning training session to subsequently identify the item when subsequent item images are taken for the item for subsequent transactions at the store.

17 Claims, 4 Drawing Sheets

REINFORCEMENT MACHINE LEARNING FOR ITEM DETECTION

BACKGROUND

Increasingly retailers are deploying technology to automate the shopping experience. Routinely, consumers can now user their mobile devices to purchase items and perform self-checkouts from stores. The next advancement is with frictionless stores, where consumers simply walk into a store and grab the items they want to purchase and leave the store without any interaction with a Self-Service Terminal (SST), a store attendant, and/or their mobile devices.

However, there are significantly technological challenges before the above scenario can be fully deployed in the industry. One of the biggest challenges is item detection when an image being processed within the store shows a consumer picking up an item and placing it in a consumer bag or hand. A variety of image processing is needed to properly identify the item in the image.

Machine learning approaches require training on 900 or more images of a single item before the accuracy of the item detection is good enough for store deployment. The images used for training are captured for a single item at many different angles, distances, and under different lighting conditions. In fact, 5,000 images of a single item is preferred for item detection training.

On average, the retail industry introduces over 100,000 new items each year. Taking 900 to 5,000 images of each new item in order to properly train an image item detection process is infeasible in terms of staffing, expense, and time.

Accordingly, there is a need to provide improved machine learning for item detection that is not dependent on any pre-established quantity of captured images taken for new items as they are introduced into the retail environment.

SUMMARY

In various embodiments, methods and a system for reinforcement machine learning for item detection are presented.

According to an embodiment, a method for reinforcement machine learning for item detection is presented. Specifically, and in one embodiment, an image of an item with an item description is obtained during a checkout for the item. A machine-learning algorithm is trained on the image to recognize the item from subsequent images taken of the item based on the item description to the purchase of the item.

DETAILED DESCRIPTION

Figure 1:
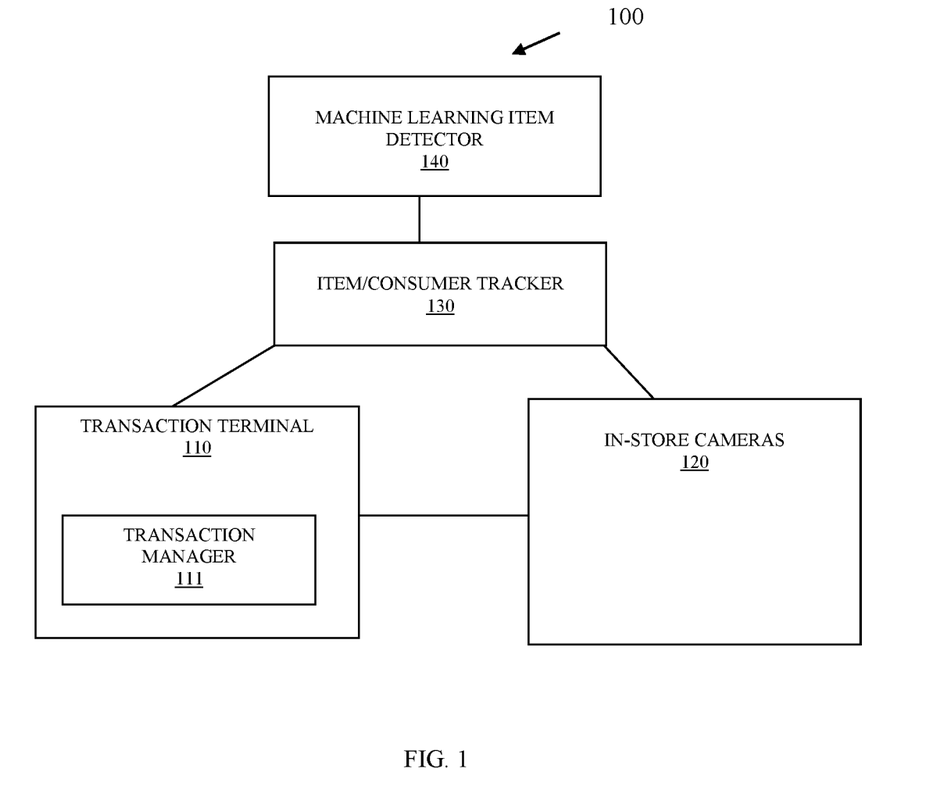
FIG. 1 is a diagram of a system for reinforcement machine learning for item detection, according to an example embodiment.

FIG. 1 is a diagram of a system 100 for reinforcement machine learning for item detection, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of reinforcement machine learning for item detection, presented herein and below.

The system 100 includes a plurality of transaction terminals 110, each having one or more hardware processors that execute executable instructions from a non-transitory computer-readable storage medium representing a transaction manager 11. This system 100 further includes a plurality of in-store cameras 120, an item/consumer tracker 130, and a machine-learning item detector 140. The item/consumer tracker 130 and the machine learning item detector 140 are executable instructions that are executed on one or more hardware processors of a server. The server may be local to the store associated with the transaction terminals 110 or remotely located from the store.

Initially, the machine-learning item detector 140 is trained on some rudimentary image recognition on items to recognize boxes, cans, bottles, etc. Training entails providing source images of items along with the known expected result (box, can, bottle, etc.). The machine-learning item detector 140 uses machine learning approaches to identify factors and features from the training set of images that are unique to the boxes, cans, bottles, etc., such that the machine-learning item detector 140 can predict and identify on its own from images boxes, cans, bottles, etc. from provided images. The accuracy of the machine-learning item detector 140 improves over time as more and more images are processed and actual results (known boxes, bottles, cans, etc.) are provided back to the machine-learning item detector 140. That is, the factors, features, weights associated with the machine-learning algorithm change and the algorithm learns with increasing accuracy how to identify the boxes, cans, bottles, etc.

In an embodiment, some additional training of the machine-learning item detector 140 may take place for specific items but with a low volume of training images, such that the accuracy of the machine-learning item detector 140 is initially low in performing item detection and recognition.

The machine-learning item detector 140 is then activated in the store environment and interfaced to the item/consumer tracker 130. The item/consumer tracker 130 is interfaced to the cameras 120 (for receiving item images) and the transaction manager 111 for receiving item details when an item code is entered or scanned during checkout at the store.

In an embodiment, an existing transaction manager of a transaction terminal is not modified; rather, a software module (can be the item/consumer tracker 130 in some embodiments) listens for a transaction started event and/or a transaction ended event (notification) that is published or raised from the existing transaction manager, such that the item/consumer tracker 130 can acquire the transaction details, which are relayed to the machine-learning item detector 130.

During operation, the cameras 120 capture one or more images of items as consumers located within the store pick items from the shelves of the store and place the items in carts or in their arms/hands. Assuming, the machine-learning item detector 140 has not adequately trained on any picked item's image for item detection at the time that such an item is picked by a consumer, the machine-learning item detector 140 flags the item image as being unknown or as having a low confidence value for a specific item. As the consumer traverses the store, cameras 120 are capturing images of the consumer (who is also flagged and tracked as being either a known or unknown consumer in the images). The item/consumer tracker 130 uniquely keeps track of images representing a particular unique consumer while in the store and on images of items that are possessed (picked up) by the consumer within the store.

When the consumer approaches the transaction terminal 110 for item checkout, the item/consumer tracker 130 identifies the consumer at the transaction terminal 110 and when the consumer scans (or a cashier) scan the unknown but uniquely identified image of the item for payment, the item code and/or item description resolved by the transaction manager 111 is obtained by the item/consumer tracker 130. The item images that were retained for the unknown but uniquely identified image along with the item details are then provided by the item/consumer tracker 130 to the machine-learning item detector 140.

This allows the machine-learning item detector 140 to train for item detection on newly introduced items within the store for which the machine-learning item detector 140 may have never previously received any training on. The actual identified item and all the various images for that item are provided for training of the machine-learning item detector 140.

Additionally, the machine-learning item detector 140 is better trained and improves its accuracy for item detection and recognition for items upon which it has been previously trained to recognize because more images of such items and the actual item identification is continuously being fed into the machine-learning item detector 140 for training and improvement in item detection and recognition.

In an embodiment, the machine-learning item detector 140 receives in batch all the item images along with their actual identifications (as identified during checkout by the transaction manager 111) and performs a training session on those new images with all the historically available images available for each item once daily (such as early in the morning or late at night).

In an embodiment, the images for each item and its actual identification (item description) is provided by the item/consumer tracker 130 to the machine-learning item detector 140 at the end of each transaction or during each transaction. The machine-learning item detector 140 maintains the item images and item descriptions for a full training session at preconfigured intervals of time (such as twice daily, once every day, once every two days, etc.).

The accuracy of the machine-learning item detector 140 can be tracked during consumer shopping based on item identifications returned from the machine-learning item detector 140 to the item/consumer tracker 130 and the actual reported item identifications provided by the transaction manager 111 during item checkouts. When the machine-learning item detector 140 reaches a threshold level of accuracy, the store can begin to initiate and roll out fully automated frictionless shopping to its consumers. In such situations, and in particular for newly introduced items, the consumer can be prompted to scan an item barcode before leaving the store for any item image for which the accuracy of the machine-learning item detector 140 in item detection has not yet reached a desired threshold. This can be achieved in a variety of ways, such as through a mobile application on a mobile device of the consumer, through an in-store attendant that approaches the consumer and indicates that a particular item needs to be scanned or identified, etc. The transaction terminals 110 remain available to the consumers for such purposes as well.

The system 100 provides a smooth transition from a fully friction store (requiring checkout at the transaction terminal 110) to a fully frictionless store with minimal pre-trained captured images being required for each item within the store and for each new item that introduced to the store. The approach can be used in dual friction and frictionless stores as well.

Furthermore, the machine-learning item detector 140 may reside on a remote server (at least initially), such that it is interfaced and trained (as discussed above) on multiple store locations for multiple stores. Each store includes its own local item/consumer tracker 130 that interfaces to the machine-learning item detector 140 in the manners discussed above. This allows the machine-learning item detector 140 to obtain a voluminous amount of images for a single item at multiple different angles and under a variety of disparate lighting conditions, and allows the accuracy of the machine-learning item detector 140 to markedly increase over a short period of time. Once the threshold level of accuracy in item recognition/detection is achieved, the item/consumer tracker 130 can rely on item recognition provided by the machine-learning item detector 140 during actual shopping circumstances within the stores. In some cases, a store that has just added a new item for retail can substantially benefit when such new item has been in multiple other stores and has had images captured for which the machine-learning item detector 140 is already trained on and reached a desired level of accuracy for.

Furthermore, the response time of the machine-learning item detector 140 in identifying items from provided images can be increased over time from the training discussed above because the machine-learning item detector 140 is able to uniquely identify just those features and characteristics of item images that are of most import in recognizing an item. That is, image feature noise (non-discriminating image characteristics) is reduced over time, such that rapid item identification is achieved.

In some embodiments, independent instances of the machine-learning item detector 140 can be pushed to the edge of the network to each store location (local area networks or geographically proximate to each store location) for improved item identification response times. In such cases, after full training sessions are completed on a master network instance of the machine-learning item detector 140, the updated instances of the machine-learning item detector 140 can be pushed to the edge of each stores local network.

In an embodiment, the transaction terminal 110 is one or more of: a mobile device (operated by a consumer or a store attendant), a Point-Of-Sale (POS) terminal (operated by a store attendant), a tablet (operated by the consumer or a store attendant), a wearable processing device (operated by the consumer or a store attendant), and a Self-Service terminal (operated by a consumer for self-checkout). In cases, where the transaction terminal is a personal and mobile device of the consumer, the transaction manager 111 is a mobile application that processes on the consumer's mobile device.

The cameras 120 capture images of items and a consumer that possess the items. Multiple images exist for each item and the consumer during a single shopping experience of the consumer within a store and as the consumer traverses the store. As images are taken, the item/consumer tracker 130 flags each image with a unique identifier, such that a single item can be flagged and associated with multiple images during the shopping experience. Small portions of those images or metadata associated with those images are provided by the image/consumer tracker 130 to the machine-learning item detector 140, and the machine-learning item detector 140 returns back to the item/consumer tracker an item identification, an item identification with a confidence factor, or an unknown item indication. A variety of information can reduce the processing needed for the images by the machine-learning item detector 140 and reduce the amount of image data that has to be passed from the item/consumer tracker 130 to the machine-learning item detector 140. For example, the item/consumer tracker can be preconfigured to know the exact store location, aisle, and shelf from which an image is taken such that the potential item list for any item picked is a smaller subset than the universe of all available items within the store. Additionally, the item/consumer tracker 130 can be configured to remove item background pixels from the item images, perform item edge detection for obtaining just item image edge pixel data with the pixel data contained within the outline of item in the item image, reduce the resolution of item images, etc. As soon as an item image provided by the item/consumer tracker 130 is identified with the appropriate level of confidence by the machine-learning item detector 140, no real time additional item images for that item need to be sent by the item/consumer tracker 130 to the machine-learning item detector 140 during the shopping experience; rather, these additional item images can be batched or provided later to the machine-learning item detector 140 for subsequent full training sessions, if desired. This can reduce the network bandwidth significantly and improve item identification/recognition/detection response times during a shopping experience.

These and other embodiments are now discussed with reference to the FIGS. 2-4.

Figure 2:
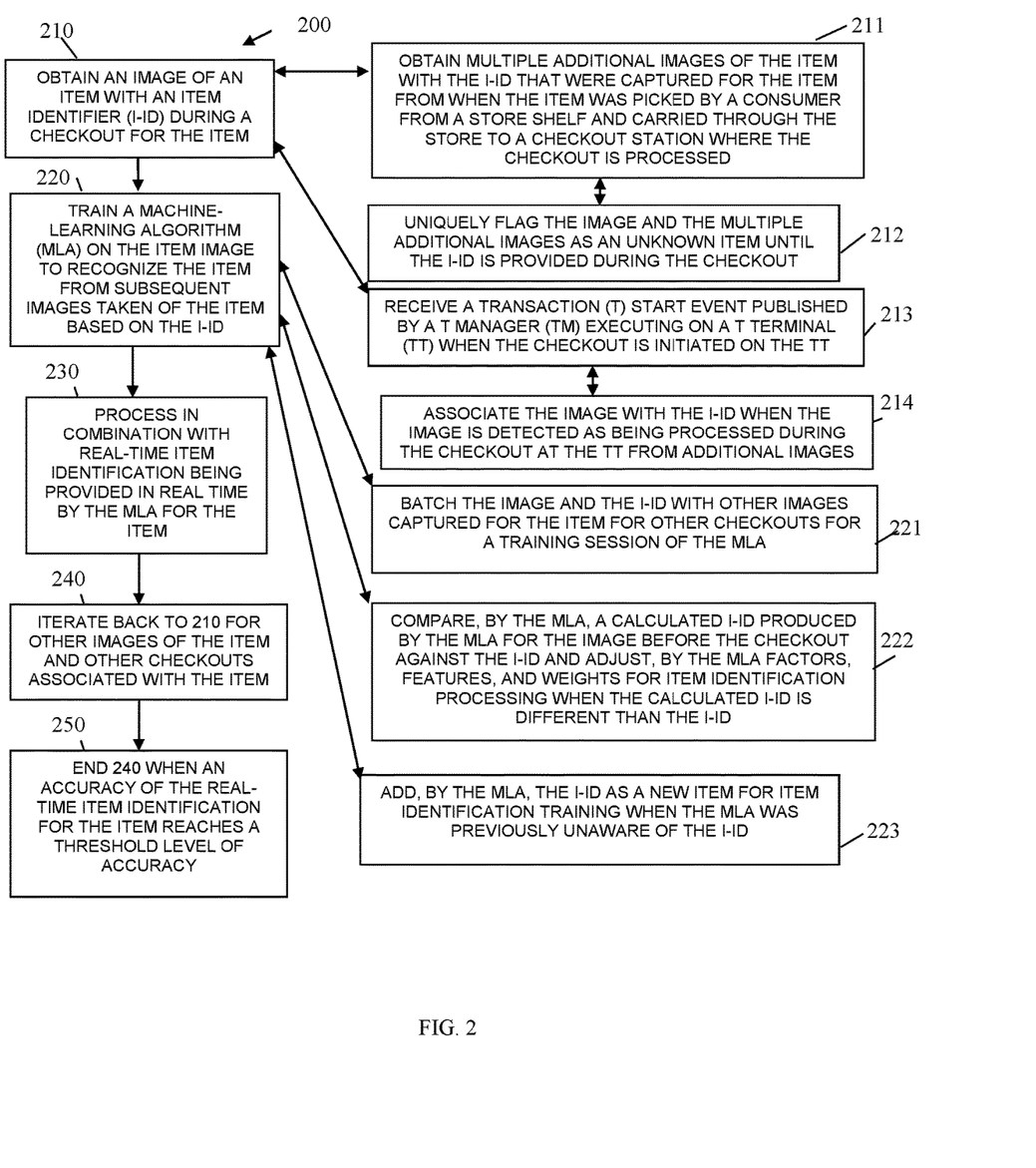
FIG. 2 is a diagram of a method for reinforcement machine learning for item detection, according to an example embodiment.

FIG. 2 is a diagram of a method 200 for reinforcement machine learning for item detection, according to an example embodiment. The software module(s) that implements the method 200 is referred to as an "item identifier." The item identifier is implemented as executable instructions programmed and residing within memory and/or a non-transitory computer-readable (processor-readable) storage medium and executed by one or more processors of a device. The processor(s) of the device that executes the item identifier are specifically configured and programmed to process the item identifier. The item identifier has access to one or more network connections during its processing. The network connections can be wired, wireless, or a combination of wired and wireless.

In an embodiment, the device that executes the item identifier is a server. In an embodiment, the server is a cloud processing environment that comprises multiple servers cooperating with one another as a single server. In an embodiment, the server is a Local Area Network (LAN) server.

In an embodiment, the device that executes the item identifier is a network-edge device that is local or on an edge of a LAN of a retail store.

In an embodiment, the item identifier is machine learning item detector 140.

At 210, the item identifier obtains an image of an item with an item identifier. The item identifier may be receiving images for the item that the item identifier has uniquely identified as being an unknown item before the item identifier is received, such that all the images can be associated with the item identifier once the item identifier is received during a checkout. In an embodiment, the item identifier can be received prior to a checkout when a customer is interactively asked what an item was that the customer just picked up via a customer mobile device. The customer may scan the item to provider the item identifier or enter a description or item code into the mobile application of the customer's mobile device.

In an embodiment, at 211, the item identifier obtains multiple additional images of the item with the item identifier that were captured for the item from when the item was picked by a consumer from a store shelf and carried through the store to a checkout station where the checkout is processed. That is, side views, front views, top down views, etc. of the item may be available from an item/consumer tracker 130; all of such images can be provided for the item with the item identifier when the item is identified during the checkout.

In an embodiment of 211 and at 212, the item identifier flags the image and the multiple additional images as an unknown but unique item until the item identifier is provided during checkout. Again, the image and images are uniquely associated with the item even through the item itself is unknown. Additionally, some of the multiple additional images may already have been received by the item identifier during the shopping.

In an embodiment, at 213, the item identifier receives a transaction start event published by a transaction manager executing on a transaction terminal when the checkout is initiated on the transaction terminal. In an embodiment, the transaction terminal is the transaction terminal 110 and the transaction manager is the transaction manager 111. So, when a start transaction is received, the item/consumer tracker 130 identifies from images taking of the transaction at the transaction terminal when the item image for the unknown item is being handled (scanned or manually processed), such that as soon as an item identifier (item barcode, item description, item Quick Response (QR) code) is identified, the item identifier is associated with the unknown item image.

In an embodiment, at 214, the item identifier associates the image with the item identifier when the image is detected as being processed during the checkout at the transaction terminal from additional images. That is, the item identifier knows what the result is supposed to be from processing the unknown item image and the additional unknown item images through the item identifier.

At 220, the item identifier trains a machine-learning algorithm on the item image to recognize the item from subsequent images taken of the item based on the item identifier. That is, the input to the machine-learning algorithm is the item image and the expected output is the item identifier. The machine-learning algorithm identifies features, factors, weights and a technique that takes the item image as input and produces the item identifier as output. As more and more images (obtained under different lighting conditions, at different angles and distances) are processed by the machine-learning algorithm for the item identifier, the technique is enhanced and learns how to adjust the features, factors, and weights to improve its accuracy in identifying the item from received images of the item that are received as input to the machine-learning algorithm.

In an embodiment, at 221, the item identifier batches the image and the item identifier with other images captured for the item for other checkouts for a training session of the machine-learning algorithm. That is, a predefined intervals of time or based on a predefined event, the item identifier collects all the images taken for the item that are associated with the item identifier and performs a training session to identify the important image features, factors, and weights for producing the algorithm/technique that when provided an unknown image for the item accurately produces as output the item identifier for the item.

In an embodiment, at 222, the item identifier compares a calculated item identifier produced by the machine-learning algorithm for the image before the checkout against the item identifier obtained at 210. The machine-learning algorithm then adjusts image factors, features, and weights for item identification processing when the calculated item identifier is different than the item identifier.

In an embodiment, at 223, the machine-learning algorithm adds the item identifier as a new item for item identification training when the machine-learning algorithm was previously unaware of the item identifier. That is, the item image may be associated with an item for which the machine-learning algorithm has previously never been trained to recognize and receipt of the item image is the first such image for the item received by the machine-learning algorithm.

Figure 3:
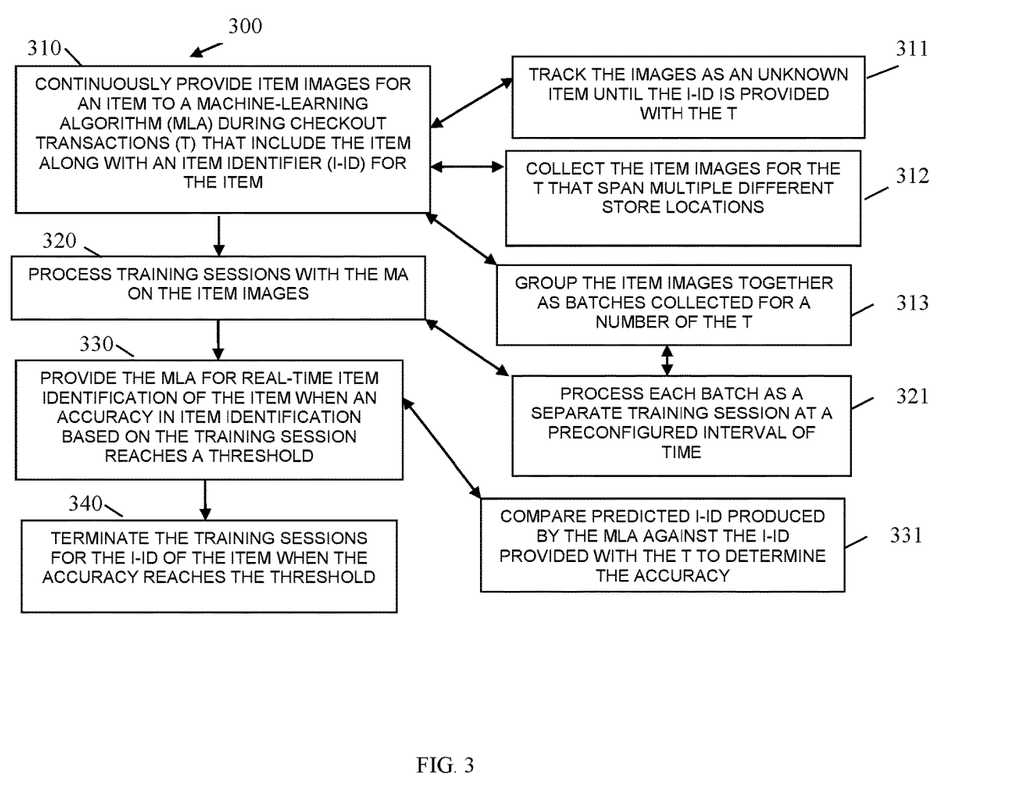
FIG. 3 is a diagram of another method for reinforcement machine learning for item detection, according to an example embodiment.

FIG. 3 is a diagram of another method 300 for reinforcement machine learning for item detection, according to an example embodiment. The software module(s) that implements the method 300 is referred to as a "machine-learning item detector." The machine-learning item detector is implemented as executable instructions programmed and residing within memory and/or a non-transitory computer-readable (processor-readable) storage medium and executed by one or more processors of a device. The processors that execute the machine-learning item detector are specifically configured and programmed to process the machine-learning item detector. The machine-learning item detector has access to one or more network connections during its processing. The network connections can be wired, wireless, or a combination of wired and wireless.

In an embodiment, the device that executes the machine-learning item detector is a server. In an embodiment, the server is a cloud processing environment that comprises multiple servers cooperating with one another as a single server. In an embodiment, the server is a LAN server that is local to a retail store.

In an embodiment, the device that executes the machine-learning item detector is a network-edge device that is on the edge of a LAN for a retail store.

In an embodiment, the machine-learning item detector is all or some combination of the machine learning detector 130 and/or the method 200.

The machine-learning item detector presents another and in some ways enhanced processing perspective to that which was described above with the FIG. 2.

At 310, the machine-learning item detector continuously provides item images for an item to a machine-learning algorithm during checkout transactions that include the item along with an item identifier for the item. The item images are input to the machine-learning algorithm and the item identifier is the expected output that the machine-learning algorithm is expected to produce as output from any of the item images received as input by the machine-learning algorithm.

In an embodiment, at 311, the machine-learning item detector tracks the images as an unknown item until the item identifier is provided with the checkout transactions.

In an embodiment, at 312, the machine-learning item detector collects the item images for the checkout transactions that span multiple different store locations. That is, item images captured at a greater frequency, at various angles, at various distances, and under various lighting conditions are collected over multiple store locations for the item identifier and provided to the machine-learning algorithm for training. This allows leverage and permits training of the machine-learning algorithm to complete more rapidly.

In an embodiment, at 313, the machine-learning item detector groups the item images together as batches collected for a number of the checkout transactions.

At 320, the machine-learning item detector processes training sessions with the machine-learning algorithm on the item images.

In an embodiment of 313 and 320, at 321, the machine-learning item detector processes each batch as a separate training session at a preconfigured interval of time.

At 330, the machine-learning item detector provides the machine-learning algorithm for real-time item identification of the item when an accuracy in item identification based on the training session reaches a threshold. That is, when a subsequent item image for the item is provided as input to the machine-learning algorithm from an item/consumer tracker 130 during a frictionless shopping session, the item/consumer tracker 130 is permitted to rely on the outputted item identifier provided by the machine-learning algorithm. Essentially, the machine-learning algorithm is productionized and released for a fully functioning frictionless store service.

In an embodiment, at 331, the machine-learning item detector compares predicted item identifiers produced by the machine learning algorithm against the item identifier provided with the checkout transactions to determine the accuracy. That is, before the machine-learning algorithm is released for in a production environment as a frictionless store component, the machine-learning item detector continuously compares the predicted item identifiers being produced by the machine-learning algorithm during shopping sessions against the actual item identifiers provided when the item is scanned at the transaction terminal during checkout. When an accuracy of the machine-learning algorithm is consistently achieved over a given period of time, the machine-learning item detector can promote the machine-learning algorithm from a testing and training phase to a production/release phase for a fully functioning frictionless store environment.

According to an embodiment, at 340, the machine-learning item detector terminates the training sessions for the item identification of the item when the accuracy reaches the threshold. As stated above, the accuracy may have to be consistently achieved over a given period of time or over a given number of provided item images before the training sessions are terminated for the machine-learning item detector.

Figure 4:
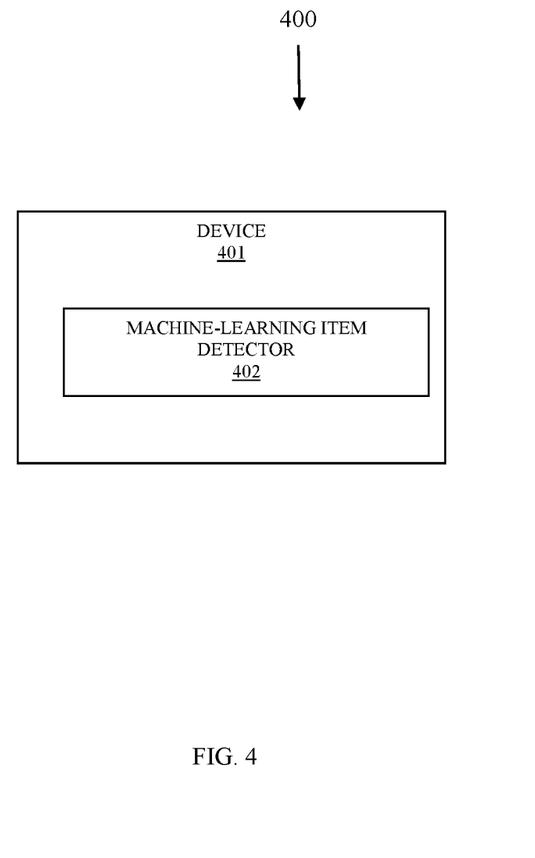
FIG. 4 is a diagram of a system for reinforcement machine learning for item detection, according to an example embodiment.

FIG. 4 is a diagram of a system 400 for reinforcement machine learning for item detection, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 is the system 100.

The system 400 includes a processing device 401 and a machine-learning item detector 402.

In an embodiment, the processing device 401 is a server. In an embodiment, the server is a collection of servers that cooperate as a cloud processing environment.

In an embodiment, the processing device 401 is a network edge device.

The machine-learning item detector 402 is a set of executable instructions that is executed on one or more hardware processors of the processing device 401 from a non-transitory computer-readable storage medium or memory.

The machine-learning item detector 402 is configured to: i) train a machine-learning algorithm with item images and an item identifier provided during checkout transactions for an item, ii) compare predicted item identifiers provided by the machine-learning algorithm against the item identifier provided during the checkout transactions to produce an item identification accuracy for the machine-learning algorithm, and iii) rely on subsequent predicted item identifiers provided by the machine-learning algorithm when the item identification accuracy exceeds a threshold.

In an embodiment, the machine-learning item detector 402 is further configured to: iv) provide the machine-learning algorithm as portion of a frictionless store component for item identification of the item within the frictionless store.

It is to be noted that although the various examples presented were within the context of online middleware food service providers, other embodiments of the invention are not so limited, such that any retailer middleware service that sells products other than food can benefit from the teachings presented herein and above.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
obtaining an image of an item with an item identifier during a checkout for the item, wherein obtaining further includes:
obtaining multiple additional images of the item with the item identifier that were captured for the item from when the item was picked by a consumer from a store shelf and carried through the store to a checkout station where the checkout is processed; and
uniquely flagging the image and the multiple additional images as an unknown item until the item identifier is provided during the checkout; and
training a machine-learning algorithm on the item image to recognize the item from subsequent images taken of the item based on the item identifier.

2. The method of claim 1, wherein obtaining further includes receiving a transaction start event published by a transaction manager executing on a transaction terminal when the checkout is initiated on the transaction terminal.

3. The method of claim 2, wherein receiving further includes associating the image with the item identifier when the image is detected as being processed during the checkout at the transaction terminal from additional images.

4. The method of claim 1, wherein training further includes batching the image and the item identifier with other images captured for the item for other checkouts for a training session of the machine-learning algorithm.

5. The method of claim 1, wherein training further includes, comparing, by the machine-learning algorithm, a calculated item identifier produced by the machine-learning algorithm for the image before the checkout against the item identifier and adjusting, by the machine-learning algorithm factors, features, and weights for item identification processing when the calculated item identifier is different than the item identifier.

6. The method of claim 1, wherein training further includes adding, by the machine-learning algorithm, the item identifier as a new item for item identification training when the machine-learning algorithm was previously unaware of the item identifier.

7. The method of claim 1 further comprising, processing the method in combination with real-time item identification being provided in real time by the machine-learning algorithm for the item.

8. The method of claim 7 further comprising, iterating the method for other images of the item and other checkouts associated with the item.

9. The method of claim 8 further comprising, ending the iterating an accuracy of the real-time item identification for the item reaches a threshold level of accuracy.

10. A method, comprising:
continuously providing item images for an item to a machine-learning algorithm during checkout transactions that include the item along with an item identifier for the item, wherein continuously providing item images further includes:
tracking the images as an unknown item until the item identifier is provided with the checkout transaction;
processing training sessions with the machine-learning algorithm on the item images; and
providing the machine-learning algorithm for real-time item identification of the item when an accuracy in item identification based on the training session reaches a threshold.

11. The method of claim 10, wherein continuously providing further includes collecting the item images for the checkout transactions that span multiple different store locations.

12. The method of claim 10 further comprising, terminating the training sessions for the item identification of the item when the accuracy reaches the threshold.

13. A method comprising:
continuously providing item images for an item to a machine-learning algorithm during checkout transactions that include the item along with an item identifier for the item, wherein continuously providing further includes grouping the item images together as batches collected for a number of the checkout transactions;
processing training sessions with the machine-learning algorithm on the item images; and
providing the machine-learning algorithm for real-time item identification of the item when an accuracy in item identification based on the training session reaches a threshold.

14. The method of claim 13, wherein processing further includes processing each batch as a separate training session at a preconfigured interval of time.

15. A method comprising:
continuously providing item images for an item to a machine-learning algorithm during checkout transactions that include the item along with an item identifier for the item;
processing training sessions with the machine-learning algorithm on the item images; and
providing the machine-learning algorithm for real-time item identification of the item when an accuracy in item identification based on the training session reaches a threshold, wherein providing further includes comparing predicted item identifiers produced by the machine learning algorithm against the item identifier provided with the checkout transactions to determine the accuracy.

16. A system, comprising:
a processing device having at least one processor configured to execute instructions from a non-transitory computer-readable storage medium, the instructions representing a machine-learning item detector; and
the machine-learning item detector configured to: i) train a machine-learning algorithm with item images and an item identifier provided during checkout transactions for an item, ii) compare predicted item identifiers provided by the machine-learning algorithm against the item identifier provided during the checkout transactions to produce an item identification accuracy for the machine-learning algorithm, and iii) rely on subsequent predicted item identifiers provided by the machine-learning algorithm when the item identification accuracy exceeds a threshold.

17. The system of claim 16, wherein the machine-learning item detector is further configured to iv) provide the machine-learning algorithm as portion of a frictionless store component for item identification of the item within the frictionless store.

* * * * *